United States Patent Office 3,631,061
Patented Dec. 28, 1971

3,631,061
ACYLAMIDO PHENYL IMIDAZOLONES
Stanley C. Bell, Penn Valley, and Carl Gochman, Philadelphia, Pa., assignors to American Home Products Corporation, New York, N.Y.
No Drawing. Continuation-in-part of application Ser. No. 543,555, Apr. 19, 1966. This application Feb. 12, 1968, Ser. No. 704,581
Int. Cl. C07d 49/30
U.S. Cl. 260—309.7     4 Claims

ABSTRACT OF THE DISCLOSURE

Acylamido phenyl imidazolones are prepared by reaction of an acylamido acetanilide with alkali. The compounds so prepared are pharmacologically active as CNS depressant and anticonvulsant agents.

---

This is a continuation-in-part of our earlier filed application, Ser. No. 543,555, filed Apr. 19, 1966.

The present invention relates to the preparation of new and useful acetanilido derivatives, resulting in new and useful acylamido imidazolones.

The compounds are prepared by the following reaction scheme in which the meaning of the various symbols will be described below.

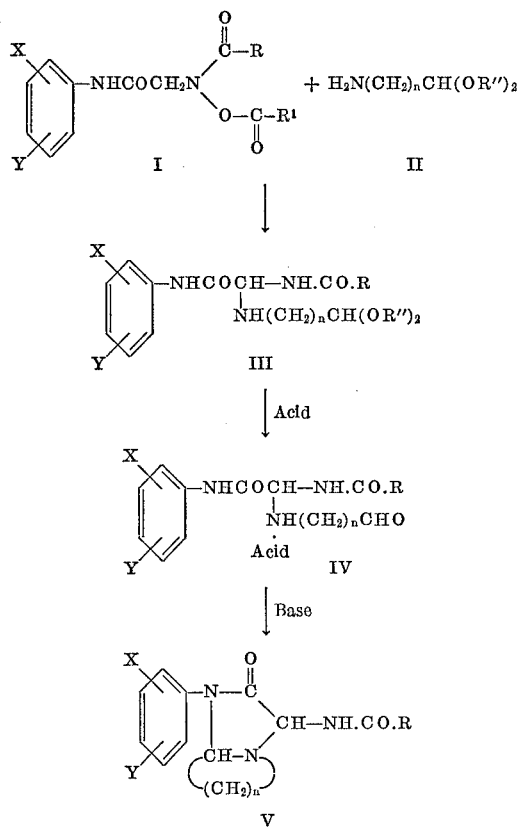

The symbols R, $R^1$ and $R''$ are intended to represent lower alkyls of 1 to 6 carbon atoms while X and Y stand for either hydrogen, lower alkyl or lower alkoxy of 1 to 2 carbon atoms, halogen, preferably chlorine or bromine or halo(lower) alkyl, preferably trifluoromethyl with Y additionally representing a monocyclic aroyl radical Preferred final compounds are those where R represents methyl, X represents chlorine and Y is benzoyl. The letter $n$ is intended to stand for a whole number from 3 to 5, preferably 3.

In the reaction scheme shown above, the term "Acid" is intended to represent either a non-oxidizing mineral acid, for example, hydrochloride, sulfuric, phosphoric, etc., or an organic acid, for example, tartaric, malonic, maleic, citric, phthalic, salicylic acids or the like. The term "Base" is intended to represent a strongly basic material, preferably an alkali metal hydroxide, for example, sodium hydroxide.

To carry out the process steps as illustrated, a 2-acyloxyacylamino-acetanilide is reacted in a solvent medium, preferably alcoholic, with an amino alkanol acetal at about room temperature. The amino-acetal attaches to the alpha carbon of the acetyl nucleus, replacing the acyloxy radical, thereby forming a 2-acetamido-2-dialkoxyalkylamino acetanilide, shown as compound III.

The aminoalkyldialkoxy reactants are known compounds and may be prepared by known procedures. The acetanilido starting reactants are also known and may be prepared as described, for example, in Canadian Pat. No. 765,831, issued Aug. 22, 1967.

The acetanilide so formed (III) is then reacted under acid hydrolysis conditions in a temperature range of about 20° to 50° C., preferably with an acid of the type indicated above, thus forming the corresponding salt of the resultant 2 - acetamido-2-oxoalkylamino acetanilide, indicated as compound IV.

In a final reaction, when one treats the oxoalkylamino acetanilide with a relatively strong base at about room temperature, there is formed, surprisingly, the bicyclic compound, having an imidazole nucleus identified as compound V.

Compounds of the imidazole type (V) are also capable of forming acid-addition salts and where water-solubility is desired, the desired base may be reacted with hydrogen halide, sulfuric acid or other non-oxidizing mineral acid, or reaction with an organic acid, for example, acetic, fumaric, maleic acid, or the like will produce the desired acid-addition salt. The acid selected should be one which will form a non-toxic, pharmaceutically acceptable salt.

In determining the possible utility of the final compounds, they were submitted to a pharmacological procedure as follows:

A compound is first administered orally to three mice (CF–1, 14 to 24 grams) at each of the following doses: 400, 127, 40 and 12.7 mg./kg.

The animals are watched for a minimum of two hours during which time signs of general stimulation (e.g. increased spontaneous motor activity, hyperactivity on tactile stimulation, twitching), general depression (e.g. decreased spontaneous motor activity, decreased respiration) and autonomic activity, e.g. miosis, mydriasis, diarrhea) are noted. The animals are tested for changes in reflexes (e.g. flexor, extensor) and are rated by use of a pole climb and inclined screen for the presence of sedation-ataxia. The experiment is terminated by subjecting each animal to a maximal electroshock to test for anti-convulsant activity which may be elicited by the procedure described by Swinyard et al., J. Pharmacol., 106, 319, 1952.

If the compound demonstrates no activity following oral administration, the procedure is repeated following intraperitoneal administration.

Under the test indicated above the final compounds of the invention have been found pharmacologically active and therefore useful as central nervous system depressants and anti-convulsants at a dose of 400 mg./kg. without undue toxic effects. The compounds are therefore deemed useful in the field of experimental or comparative pharmacology where they could be used as indicated above.

Additionally, it is contemplated that the compounds may be used in veterinary medicine to reduce CNS activity and as anti-convulsants.

The products could be used either in typical solid or liquid dosage forms. In the solid form, the active drug is preferably combined with extenders or carriers that are relatively inert, for example, lactose or alkaline earth metal carbonates. In the liquid form, when given orally, the drug may be used with a suspending agent, for example, carboxymethylcellulose in water or an oleaginous vehicle. When used parenterally, the drug, in the form of an acid-addition salt is dissolved in an aqueous vehicle.

The following examples are given for illustrative purposes only and should not be considered limitative of the inventive scope:

EXAMPLE 1

2-acetamido-2'-benzoyl-4'-chloro-2-(4,4-diethoxybutyl-amino) acetanilide

To a suspension of 18.0 g. of 2-[acetoxy(acetyl)amino]-2'-benzoyl-4'-chloroacetanilide in 180 ml. of ethanol was added to solution of 18 g. of γ-aminobutyraldehyde diethylacetal in 60 ml. of ethanol. The reaction was slightly exothermic and formed a clear solution. After stirring for ½ hour, the soltuion was diluted with 400 ml. of water and chilled. The resultant solid (13.4 g., M.P. 120–122° C.) was collected. Recrystallization from cyclohexane gave a M.P. 121–123° C.

*Analysis.* — Calcd. for $C_{25}H_{32}ClN_2O_5$ (percent): C, 61.27; H, 6.58; N, 8.58; Cl, 7.24. Found (percent): C, 61.25; H, 6.15; N, 8.65; Cl, 7.50.

EXAMPLE 2

2-acetamido-2'-benzoyl-4'-chloro-2-(4-oxobutylamino) acetanilide hydrochloride

To a suspension of 1.8 g. of 2-acetamido-2'-benzoyl-4'-chloro-2-(4,4-diethoxybutylamino)acetanilide in 30 ml. of water was added 25 ml. of 1 N hydrochloric acid. The resultant clear solution was stirred for 1½ hours during which time a solid began to precipitate out. The product was collected and recrystallized from methanol and had an M.P. of 134–136° C.

*Analysis.*—Calcd. for $C_{21}N_{22}ClN_3O_4 \cdot HCl$ (percent): C, 55.76; H, 5.12; N, 9.29; Cl, 15.68. Found (percent): C, 55.39; H, 5.11; N, 9.48; Cl, 16.0.

EXAMPLE 3

3-acetamido-1-(2-benzoyl-4-chlorophenyl)-5,6,7,7a-tetrahydro-1H-pyrrolo[1,2-a]imidazol-2(3H)-one To a solution of 1.7 g. of 2-acetamido-2'-benzoyl-4'-chloro-2(4-oxobutylamino)acetanilide hydrochloride in water was added 5 ml. of 4 N sodium hydroxide. After a few minutes a solid precipitated out of which was collected (0.7 g., M.P. 185–187° C.) and recrystallized from benzene. The M.P. did not change.

*Analysis.*—Calcd. for $C_{21}H_{20}ClN_3O_3$ (percent): C, 63.39; H, 5.07; N, 10.50; Cl, 8.91. Found (percent): C, 63.31; H, 4.95; N, 10.54; Cl, 9.10.

If one wishes to simplify the above process steps and where the interest is primarily in the imidazole final product, the intermediate produced according to Example 1 may be treated first with acid and then with alkali hydroxide as shown in the following example.

EXAMPLE 4

To a mixture of 9.8 g. of 2-acetamido-2'-benzoyl-4'-chloro-2-(4,4-diethoxybutylamino)acetanilide and 100 ml. of water was added a soltuion of 30 ml. of 2 N hydrochloric acid and the resultant solution was warmed at 40° C. for 15 minutes. The solution was cooled and to it was added 50 ml. of benzene. With stirring there was added 40 ml. of 2 N sodium hydroxide solution. After 1 hour the precipitate was collected. There was obtained 6.3 g. of product, M.P. 185–187° C., which was the same as produced by Example 3.

In the same manner as described above, one may similarly prepared a 3 - acylamido - 3,5,6,7,8,8a - hexahydropyrido-(1,2-a)imidazol-2(1H)-one or a 3-acylamido-5,6,7,8,9,9a - hexahydro-1H-azepino(1,2-a)imidazol-2(3H)-one, by starting with an omega-aminovaleraldehyde or caproaldehyde-di(lower)alkylacetal.

The invention claimed is:

1. A compound having the formula:

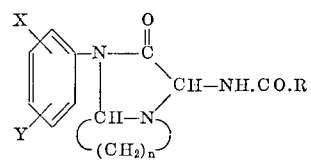

in which X and Y stand for hydrogen, lower alkyl or lower alkoxy of 1 to 2 carbon atoms, chlorine, bromine or trifluoromethyl with Y additionally representing benzoyl, R stands for a lower alkyl of 1 to 6 carbon atoms and $n$ stands for a whole number from 3 to 5.

2. A compound of claim 1; in which X is chlorine, Y is benzoyl with R and $n$ being as aforesaid.

3. As a compound of claim 1; in which X is chlorine, Y is benzoyl in the 2-position, R is methyl and $n$ is 3.

4. As a compound of claim 1; 3-acetamido-1-(2-benzoyl - 4 - chloro-phenyl)-5,6,7,7a-tetrahydro-1H-pyrrolo[1,2-a]imidazol-2(3H)-one.

References Cited

UNITED STATES PATENTS 3,474,093  10/1969  McCaully et al. _____ 260—247.1

OTHER REFERENCES

Hofmann: "Imidazole and Its Derivatives," Interscience Publishers, Inc., New York, 1953, p. 242.

HENRY R. JILES, Primary Examiner

G. T. TODD, Assistant Examiner

U.S. Cl. X.R.

260—294 AC, 562 N; 424—267, 273